United States Patent [19]
Frost

[11] 3,991,509
[45] Nov. 16, 1976

[54] SWING-FRAME ANIMAL TRAP

[76] Inventor: John E. Frost, Rte. 1, Antwerp, N.Y. 13608

[22] Filed: Sept. 17, 1975

[21] Appl. No.: 614,131

[52] U.S. Cl. ......................................... 43/90; 43/93
[51] Int. Cl.² ........................................ A01M 23/26
[58] Field of Search .................... 43/88, 90, 92, 93; 108/118; 5/116

[56] References Cited
UNITED STATES PATENTS

| | | | |
|---|---|---|---|
| 1,209,679 | 12/1916 | Decker | 5/116 |
| 3,146,545 | 9/1964 | Frost | 43/90 |
| 3,421,251 | 1/1969 | Hofmeister | 43/92 |
| 3,426,471 | 2/1969 | Lehn | 43/92 |

Primary Examiner—Louis G. Mancene
Assistant Examiner—Daniel J. Leach
Attorney, Agent, or Firm—Robert K. Youtie

[57] ABSTRACT

An animal trap including a pair of pivoted open frames resiliently urged from a set position to a closed position, the frames each being fabricated of a pair of elongate members having respective pairs of ends connected together, and a releasable catch means for holding the frames in set position including a holding hook and releasing trigger.

8 Claims, 5 Drawing Figures

SWING-FRAME ANIMAL TRAP

BACKGROUND OF THE INVENTION

In prior animal trap constructions, it has been relatively expensive to fabricate the open frames, both of strip material and rod stock, as it was generally considered necessary that each frame be formed of a single piece. Also, prior releasable catch means usually involved relatively complex and expensive mechanisms, often difficult to manufacture, assemble and use.

SUMMARY OF THE INVENTION

It is, therefore, an important object of the present invention to provide a swing-frame type of animal trap which permits of more economical fabrication of the trap frames, while of enhanced durability and staunchness, effecting economies both in materials and labor.

It is a further object of the present invention to provide a animal trap of the type described having a highly simplified releasable catch construction, which effects savings in manufacture and assembly, is highly reliable in operation, and relatively easy to use.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
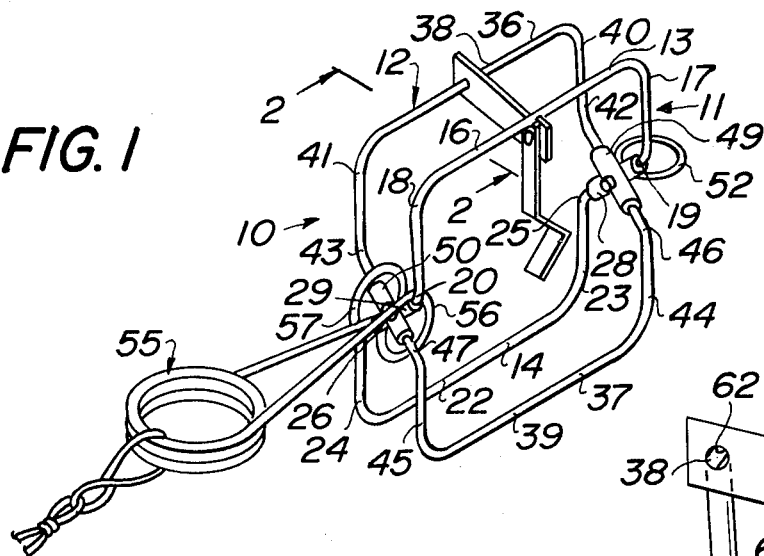
FIG. 1 is a top perspective view showing an animal trap of the present invention in a set condition of use.
Figure 2:
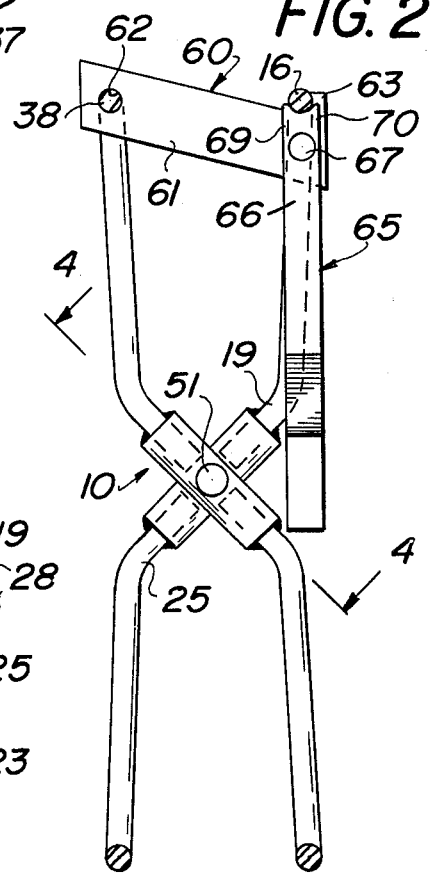
FIG. 2 is a sectional elevational view taken generally along the line 2—2 of FIG. 1.
Figure 3:
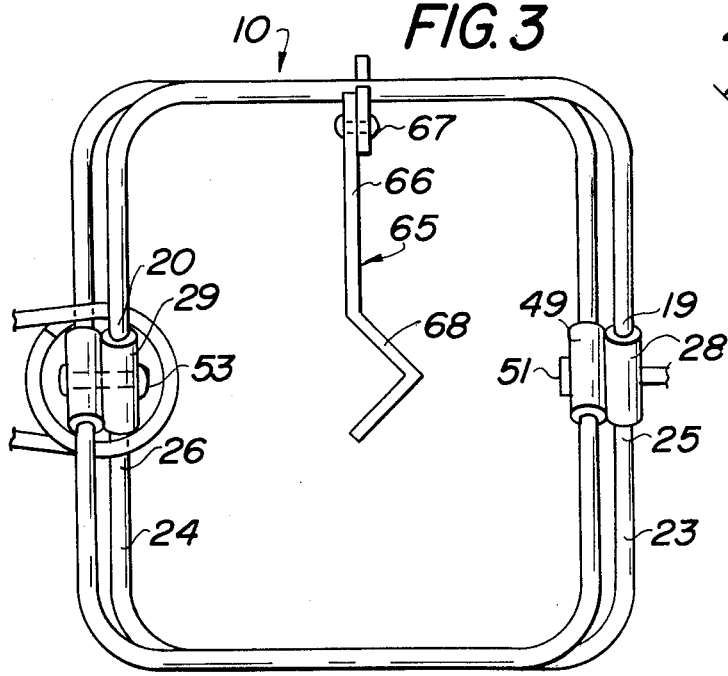
FIG. 3 is an elevational view taken from the right-hand side of FIG. 2.

Referring now more particularly to the drawings, a trap of the present invention is there generally designated 10, see FIGS. 1–3, and includes a pair of essentially similar, generally rectangular, open frames or jaws 11 and 12. The open frame 11 includes generally parallel, spaced upper and lower members 13 and 14, each fabricated of wire or rod stock and being substantially identical in construction. The upper elongate member 13 includes a major medial portion or length 16 having a pair of side or end portions 17 and 18 bent in parallelism with each other generally normal to the major, medial portion 16, and terminal portions 19 and 20 extending from the free ends of respective side portions 17 and 18 oblique thereto in parallelism with each other. In the set position, the medial portion 16 of upper member 13 is uppermost, the side or end portions 17 and 18 depending therefrom, and the terminal portions 19 and 20 extending obliquely downwardly and inwardly.

The lower member 14 includes a major, medial portion 22 which is lowermost and generally parallel to the medial portion 16, a pair of side or end portions 23 and 24 upstanding in parallelism with each other generally normal to the medial portion 22, and a pair of endmost or terminal portions 25 and 26 extending obliquely upwardly in parallelism with each other respectively toward and terminating short of adjacent terminal portions 19 and 20.

Figure 4:
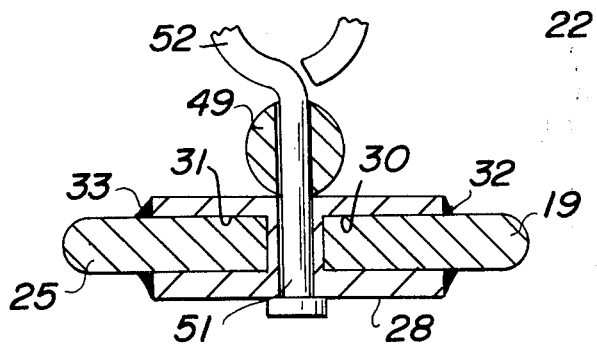
FIG. 4 is a partial sectional view taken generally along the line 4—4 of FIG. 2.

A pair of generally cylindrical, elongate ferrules 28 and 29 respectively connect together adjacent pairs of endmost or terminal portions of upper and lower members 13 and 14. In particular, the connector 28, see FIG. 4, is provided in its opposite ends with a pair of coaxial blind holes 30 and 31 terminating at their inner ends short of each other and respectively receiving adjacent endmost or terminal portions 19 and 25. Thus, the blind holes 30 and 31 define sockets opening away from each other; and, the received termini 19 and 25 are preferably seated and bottomed in respective sockets and suitably secured therein, as by welding, as at 32 and 33.

The adjacent aligned termini 20 and 26 are similarly fixedly secured together by connector 29. In this assembled condition, it will be apparent that the upper member 13 is in a generally vertical plane offset horizontally from a generally vertical plane containing the lower member 14.

The other open frame 12 is essentially identical to the frame 11, including an elongate upper member 36 and lower member 37. The upper and lower members 36 and 37 respectively include elongate medial portions 38 and 39 disposed in spaced parallelism with each other. Extending from opposite ends of the intermediate major portion 38 of upper member 36 are a pair of generally parallel, depending side or end portions 40 and 41, and extending therefrom in parallelism with each other are oblique endmost or terminal portions 42 and 43. The lower member 37 is identical, but inverted, and has extending from opposite ends of the major medial portion 39 a pair of upstanding parallel spaced side or end portions 44 and 45, and extending obliquely upwardly from respective side or end portions are endmost or terminal portions 46 and 47. The terminal portions 46 and 42 are in adjacent aligned relation with each other and secured together by a connector 49, while the terminal portions 47 and 43 are similarly in alignment with each other and secured together by a connector 50. The connectors 49 and 50 may be essentially identical to the first described connectors 28 and 29, having oppositely outwardly opening holes or sockets receiving adjacent pairs of termini and having the same secured by welding or other suitable means.

As best seen in FIGS. 1 and 3, the frames 11 and 12 may extend through each other, in conventional swing-frame trap arrangement. Further, the adjacent pairs of connectors are suitably pivoted, as by rivets or pins. More specifically, the adjacent pairs of connectors 28 and 49 are pivotally connected by a pintle or pin 51 extending transversely through both connectors, medially thereof, see FIG. 4. The outer end of pivot or pin 51 may be bent to form a staking ring or loop 52, if desired.

Similarly, the adjacent pair of connectors 29 and 50 are pivotally connected together by a transversely extending pin or rod 53 extending medially through the connectors.

A spring 55 may be provided with end loops 56 and 57 each extending about elements of both frames 11 and 12, on opposite sides of pivot 53 for exerting a resilient closing force on the frames in the conventional manner.

Releasably retaining the frames in the open, illustrated position is a catch mechanism, generally designated 60, which may include an elongate member or shank 61, say fabricated of bar stock and having at one end a through hole 62. The through hole slidably and rotatably receives the medial upper member part 38 of frame 12. The other end of the shank part 61 is provided with an upwardly facing hook formation 63 having an arcuate interior 64 configured to receive the intermediate upper member portion 16 of frame 11. Advantageously, the arcuate hook region 64 extends through an arc of slightly greater than 90° to resist undesired release.

Thus, it will now be appreciated that the hook 63 may effectively retain the frame 11 against closing movement as urged by spring 55.

The catch mechanism 60 further includes a trigger 65, which may be an elongate, generally upright lever 66 pivotally connected adjacent its upper end to the hook 63, as by pivot pin 67, at a location below and beneath the arcuate hook formation 64. The lever 66 may depend gravitationally from its pivotal support 67 and may be provided on its lower end with an actuating formation 68, say of increased lateral extent and positioned for engagement by an animal to be trapped.

Figure 5:
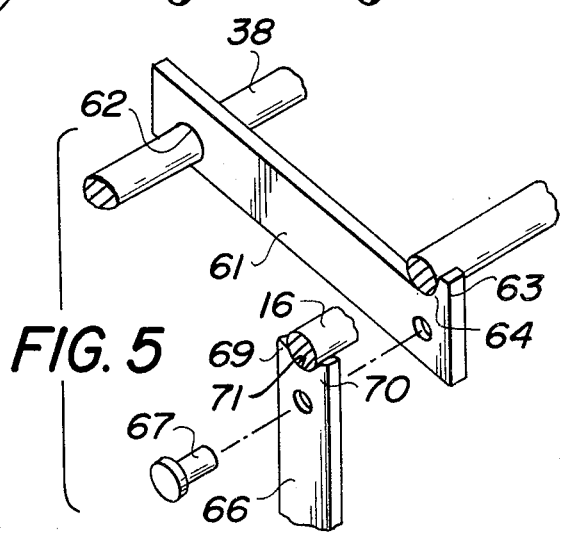
FIG. 5 is an exploded, fragmentary perspective view showing, in greater detail, applicant's catch means of the present invention.

The upper end of the lever 66, upward beyond the pivotal support 67, may be provided with a pair of spaced upstanding projections or teeth 69 and 70, see FIGS. 2 and 5, combining to define therebetween an upwardly facing recess or trough 71. In the set position, see FIGS. 2 and 5, the intermediate portion 16 of upper member 13 received in and retained by hook 63, passes between trigger projections or teeth 69 and 70 within the trough or groove 71. However, upon swinging of the lever 66, as by an animal engaging the actuating part 68, one or the other of projections or teeth 69 and 70 is swung against and beneath the intermediate upper member part 16 to displace the latter upwardly and out of the hook 63. In this manner the frames 11 and 12 are released for closing movement to catch the actuating animal.

From the foregoing, it will now be appreciated that the instant invention provides an animal trap which is adapted to be fabricated simply and economically, both regarding materials and labor, the pair of frames requiring only an inventory of two parts for economy in inventory and dies, being adapted for automation in fabrication, including assembly of the catch mechanism during frame fabrication, the catch means being of extremely simple construction and high reliability, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. In an animal trap, a pair of substantially identical open substantially aligned frames each comprising a pair of elongate substantially identical upper and lower members arranged with their ends in respective adjacent relation, and a pair of substantially identical connectors secured between each pair of adjacent ends of said members, a pair of pivots pivotally connecting the connectors of one frame to respective connectors of the other frame for relative swinging movement of said frames between a set position with one side of each frame adjacent to the other side of the other frame, catch means swingably circumposed about one of said upper members and in releasably retaining engagement with the other of said upper members in said set position, and a trigger extending from said catch means for engagement by an animal to release said catch means from its retaining engagement, said substantially identical upper and lower members being fabricated of rod stock material, and said connectors being cylindrical and each having a pair of oppositely outwardly facing sockets for fixedly receiving one adjacent pair of said member ends, said catch means having a through hole swingably receiving the rod stock material of the respective upper member.

2. An animal trap comprising a pair of open substantially aligned frames each comprising a pair of elongate upper and lower members arranged with their ends in respective adjacent relation, and a pair of connectors secured between each pair of adjacent ends of said members, a pair of pivots pivotally connecting the connectors of one frame to respective connectors of the other frame for relative swinging movement of said frames between a set position with one side of each frame adjacent to the other side of the other frame, catch means swingably circumposed about one of said upper members and in releasably retaining engagement with the other of said upper members in said set position, and a trigger extending from said catch means for engagement by an animal to release said catch means from its retaining engagement, said catch means comprising a hook engageable with said one side of said other upper member, and said trigger comprising a lever pivoted to said hook, actuating means extending from said lever for engagement by an animal to rotate said lever, and projection means extending from said lever proximate to said hook for releasing engagement with said other upper member upon rotation of said lever.

3. An animal trap according to claim 2, said hook extending more than 90° about said other upper member.

4. An animal trap according to claim 3, said projection means comprising a pair of spaced teeth on opposite sides of said other upper member for respective releasing engagement therewith upon rotation in opposite directions.

5. An animal trap according to claim 4, said lever extending generally vertically in its set condition generally beneath said other upper member, said actuating means depending from the lower end of said lever, and said teeth upstanding from the upper end of said lever.

6. An animal trap according to claim 2, said upper and lower members being substantially identical and being fabricated of rod stock material, and said connectors being cylindrical and each having a pair of oppositely outwardly facing sockets fixedly receiving one adjacent pair of said member ends.

7. An animal trap according to claim 6, said catch means having a through hole swingably receiving the rod stock material of the respective upper member.

8. In an animal trap including a pair of pivoted open frames and catch means releasably connected between said frames, said catch means comprising a shank part swingably circumposed about a portion of one of said frames, a hook part extending from said shank part in releasable retaining engagement with an adjacent portion of the other of said frames, and a trigger comprising a lever pivoted to said hook part, actuating means depending from said lever for engagement by an animal to rotate said lever, and a pair of projections upstanding from an upper region of said lever on opposite sides of said other frame for respective releasing engagement with the latter upon lever rotation in opposite directions.

* * * * *